(12) United States Patent
Vitanza et al.

(10) Patent No.: US 7,508,219 B2
(45) Date of Patent: Mar. 24, 2009

(54) APPARATUS AND METHOD FOR MEASURING LOOP INSERTION LOSS SINGLE-ENDEDLY

(75) Inventors: Timothy J. Vitanza, Mars, PA (US); Rebecca Webb Ross, Apollo, PA (US); Regis J. Nero, Jr., Export, PA (US)

(73) Assignee: Tollgrade Communications, Inc., Wilmington, DE (US)

( * ) Notice: Subject to any disclaimer, the term of this patent is extended or adjusted under 35 U.S.C. 154(b) by 14 days.

(21) Appl. No.: 11/752,963

(22) Filed: May 24, 2007

(65) Prior Publication Data

US 2007/0263777 A1 Nov. 15, 2007

Related U.S. Application Data

(62) Division of application No. 11/334,239, filed on Jan. 18, 2006, now Pat. No. 7,235,979.

(60) Provisional application No. 60/644,734, filed on Jan. 18, 2005.

(51) Int. Cl.
*G01R 31/02* (2006.01)
*H04B 3/46* (2006.01)

(52) U.S. Cl. .................................... 324/539
(58) Field of Classification Search .................. 324/539
See application file for complete search history.

(56) References Cited

U.S. PATENT DOCUMENTS

| | | | |
|---|---|---|---|
| 6,590,962 B1 | 7/2003 | Groessl et al. | |
| 6,741,676 B2 | 5/2004 | Rudinsky et al. | |
| 6,826,258 B2 | 11/2004 | Afzal | |
| 6,894,504 B2 | 5/2005 | Faulkner | |
| 6,895,081 B1 | 5/2005 | Schmidt et al. | |
| 6,985,444 B1 | 1/2006 | Rosen | |
| 7,034,546 B2 | 4/2006 | Manani et al. | |
| 7,071,703 B2 | 7/2006 | Faulkner | |
| 2003/0147508 A1 | 8/2003 | Faulkner | |
| 2004/0114527 A1 | 6/2004 | Faulkner et al. | |
| 2006/0227940 A1* | 10/2006 | Ferdosi et al. | 379/22.04 |
| 2007/0014393 A1* | 1/2007 | Jensen et al. | 379/30 |

OTHER PUBLICATIONS

K. Wong and T. Aboulnasr; "Single-Ended Loop Characterization"; IEEE Transactions on Circuits and Systems—I: Fundamental Theory and Applications, vol. 43, No. 12, Dec. 1996 (pp. 996-998).

* cited by examiner

*Primary Examiner*—Timothy J Dole
*Assistant Examiner*—Amy He
(74) *Attorney, Agent, or Firm*—The Webb Law Firm

(57) ABSTRACT

A system for determining insertion loss of a telephone line under test (LUT) predicts a length d of the LUT at each of a number of discrete frequencies. The system determines for each predicted length d a running standard deviation that is a function of the predicted length(s) d at and below the frequency where the predicted length d was determined; and determines a mean length (dm) of the LUT as a function of the lengths d of the LUT determined for each frequency at and below the pair of adjacent frequencies where the largest difference between running standard deviations occurs. The system determines a gauge of the LUT as a function of the running standard deviation the one of said pair of adjacent frequencies; and determines an insertion loss value of the LUT as a function of the gauge and the mean length dm.

6 Claims, 10 Drawing Sheets

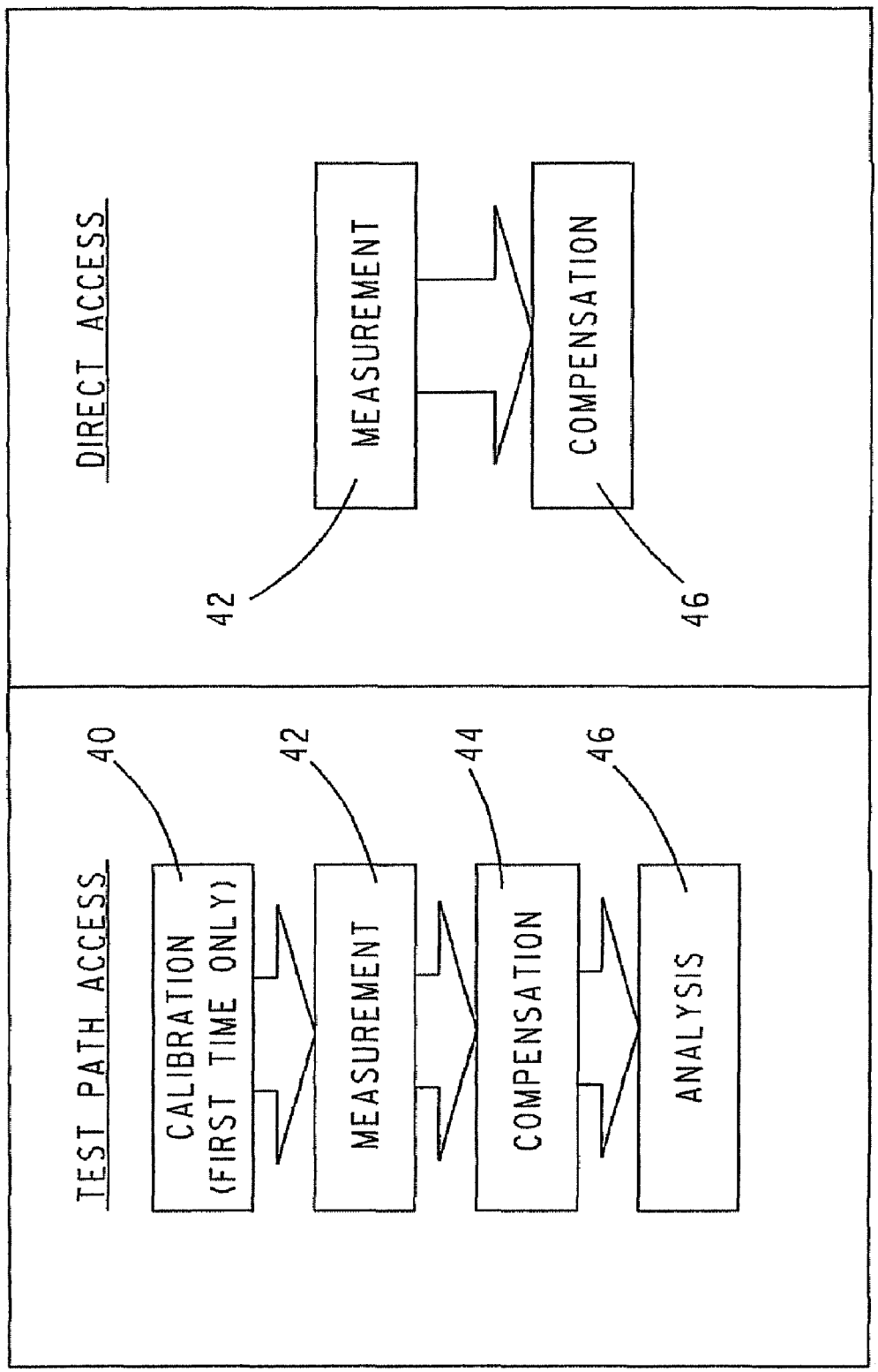

APPARATUS AND METHOD FOR MEASURING LOOP INSERTION LOSS SINGLE-ENDEDLY

CROSS REFERENCE TO RELATED APPLICATIONS

This application is a divisional of U.S. application Ser. No. 11/334,239, filed Jan. 18, 2006, which claims priority from U.S. Provisional Patent Application No. 60/644,734, filed Jan. 18, 2005.

BACKGROUND OF THE INVENTION

1. Field of the Invention

The present invention relates to a system and method of testing of a conventional telephone line and, more particularly, to a system and method determining the loop insertion loss of a telephone line single-endedly.

2. Description of Related Art

One of the most useful predictors of the maximum data rate achievable by a telephone line broadband service, such as DSL, is the electrical property of a so-called 300 kHz loop insertion loss. "Loop" is an industry term synonymous with "line". Conventional measurement of loop insertion loss requires a transmitter to be placed at one end of the line and a receiver at the other, thus making it a double-ended test. Double-ended tests are slow and costly for telephone companies because they require a "truck roll" to the customer end of each line to be tested. Far superior—and difficult—would be to measure insertion loss single-endedly from a central office location where all of the lines in an area originate.

It would also be desirable for any central office-based test apparatus to be able to make use of the so-called Numbered Test Trunk (NTT) provisions of the office's PSTN switch(es). The NTT interface enables convenient one-at-a-time test access to all telephone lines served by a switch. However, this type of test access introduces a significant technological hurdle. The "switch fabric" (a term describing the electrical makeup of the test path through the switch) has a narrowband frequency response, in that it begins attenuating signals above approximately 10 kHz in frequency. The attenuation becomes extremely severe well before 300 kHz. Thus, in addition to measuring 300 kHz insertion loss single-endedly, any successful technique must also be able to do so without the use of actual 300 kHz signals.

Another hurdle exists when testing through the switch fabric (most notably with the Lucent 5ESS, the prevalent switch type in the U.S.). Non-uniform frequency responses are often exhibited, both between different lines, and between different accesses to the same line. If left unaccounted for, these differences in frequency response would have a profound effect on measured insertion loss, rendering the measurement so erroneous or inconsistent as to have little or no value.

Described herein is a novel technique that solves these problems and others and successfully and single-endedly measures insertion loss through a PSTN switch (or other test path).

SUMMARY OF THE INVENTION

The invention is a system for determining insertion loss of a telephone line under test (LUT). The system includes low frequency test hardware comprising means for electrically stimulating the LUT at a first plurality of frequencies; means for determining for each frequency of the first plurality of frequencies an input impedance $Z_{2tr}$ of the LUT at said frequency in response to the electrical stimulation at said frequency; means for determining values for at least two of Rs, Cs, Rp and Cp from $Z_{2tr}$ at each frequency of the first plurality of frequencies, wherein Rs and Cs are the corresponding series RC equivalent components of $Z_{2tr}$ and Rp and Cp are corresponding parallel RC equivalent components of $Z_{2tr}$; and means for determining a first value insertion loss of the LUT as a function of a value of one of Rs, Cs, Rp and Cp determined at one frequency of the first plurality of frequencies and a value of another one of Rs, Cs, Rp and Cp at another frequency of the first plurality of frequencies.

The system includes high frequency test hardware comprising means for electrically stimulating the LUT at a second plurality of frequencies; means for determining for each frequency of the second plurality of frequencies an input impedance Zin of the LUT at said frequency in response to the electrical stimulation at said frequency and a length (d) of the LUT as a function of Zin at said frequency; means for determining for each frequency of a subset of the second plurality of frequencies a running standard deviation of the length d of the LUT, wherein the running standard deviation for each frequency is determined as a function of the lengths d determined at and below said frequency; means for determining which pair of adjacent frequencies of the subset of the second plurality of frequencies where the largest difference between running standard deviations occurs; means for determining a mean length (dm) of the LUT as a function of the lengths d of the LUT determined for each frequency at and below one of said pair of adjacent frequencies; means for determining a gauge of the LUT as a function of the running standard deviation of the one of said pair of adjacent frequencies; and means for determining a second value insertion loss of the LUT as a function of the gauge and the mean length dm.

The system further includes means for comparing the values of the first and second insertion losses to an expected insertion loss value for the LUT and for designating one of said first, second and expected insertion loss values as the actual insertion loss value for the LUT.

The first plurality of frequencies can include frequencies between 100 Hz and 7 kHz inclusive. The second plurality of frequencies can include frequencies between 1000 kHz and 120 kHz inclusive. Adjacent pairs of frequencies of the first plurality of frequencies can be about 100 Hz apart. Adjacent pairs of frequencies of the second plurality of frequencies can be about 610.4 Hz apart.

The means for determining the input impedance $Z_{2tr}$ of the LUT at each frequency of the first plurality of frequencies can include means for canceling out the effect of a test path disposed between the low frequency test hardware and the LUT on said determination at each frequency. The means for canceling out the effect of the test path can determine open circuit, short circuit and resistive termination responses of the test path to electrical stimulus at each frequency of the first plurality of frequencies; determine at least one compensation constant for each frequency of the first plurality of frequencies; and mathematically combine the at least one compensation constant for each frequency of the first plurality of frequencies with a corresponding value of $Z_{2tr}$ measured at said frequency to obtain the value of $Z_{2tr}$ at said frequency that is utilized to determine the values for at least two of Rs, Cs, Rp and Cp at said frequency.

In connection with the first plurality of frequencies, the open circuit termination can be a resistor having a value of greater than 10 Meg ohms, the short circuit termination can be a resistor having a value of approximately 3 ohms, and the resistive termination can be a resistor having a value of approximately 900 ohms.

The means for determining the input impedance Zin of the LUT at each frequency of the second plurality of frequencies can include means for canceling out the effect of a test path disposed between the low frequency test hardware and the LUT on said determination at each frequency. The means for canceling out the effect of the test path can determine open circuit, short circuit and resistive termination responses of the test path to electrical stimulus at each frequency of the second plurality of frequencies; determine at least one compensation constant for each frequency of the second plurality of frequencies; and mathematically combine the at least one compensation constant for each frequency of the second plurality of frequencies with a corresponding value of Zin measured at said frequency to obtain the value of Zin at said frequency that is utilized to determine the length d of the LUT at said frequency. In connection with the second plurality of frequencies, the open circuit termination can be a resistor having a value greater than 10 Meg ohms, the short circuit termination can be a resistor having a value of approximately 3 ohms, and the resistive termination can be a resistor having a value of approximately 160 ohms.

The invention is also a system for determining insertion loss of a telephone line under test (LUT). The system includes means responsive to electrical stimulation of an input of the LUT at each frequency of a first plurality of discrete frequencies for determining values of at least two of Rs, Cs, Rp and Cp at each said frequency, wherein Rs and Cs represent an equivalent series RC input impedance of the LUT and Rp and Cp represent an equivalent parallel RC input impedance of the LUT; and means for determining an insertion loss value of the LUT as a function of a value of one of Rs, Cs, Rp and Cp determined at one frequency of the first plurality of frequencies and a value of another one of Rs, Cs, Rp and Cp at another frequency of the first plurality of frequencies.

The system includes means responsive to electrical stimulation of an input of the LUT at each frequency of a second plurality of discrete frequencies for predicting a length d of the LUT at said frequency; means for determining a running standard deviation of the length d of the LUT at each frequency of the second plurality of discrete frequencies, wherein the running standard deviation at each frequency is determined as a function of the predicted lengths d determined for the LUT at and below said frequency; means for determining a mean length (dm) of the LUT as a function of the lengths d of the LUT determined for each frequency at and below the pair of adjacent frequencies where the largest difference between running standard deviations occurs; means for determining a gauge of the LUT as a function of the running standard deviation of the one of said pair of adjacent frequencies; and means for determining an insertion loss value of the LUT as a function of the gauge and the mean length dm.

The system further includes means for comparing the values of the first and second insertion losses to an expected insertion loss value for the LUT and for designating one of said first, second and expected insertion loss values as the actual insertion loss value for the LUT.

The invention is also a system for determining insertion loss of a telephone line under test (LUT). The system includes means responsive to electrical stimulation of an input of the LUT at each frequency of a plurality of discrete frequencies for predicting a length d of the LUT at said frequency; means for determining a running standard deviation of the length d of the LUT at each frequency of the plurality of discrete frequencies, wherein the running standard deviation at each frequency is determined as a function of the predicted lengths d determined for the LUT at and below said frequency; means for determining a mean or average length (dm) of the LUT as a function of the lengths d of the LUT determined for each frequency at and below the pair of adjacent frequencies where the largest difference between running standard deviations occurs; means for determining a gauge of the LUT as a function of the running standard deviation the one of said pair of adjacent frequencies; and means for determining an insertion loss value of the LUT as a function of the gauge and the mean length dm.

The invention is also a method of determining insertion loss of a telephone line under test (LUT). The method includes (a) electrically stimulating the LUT at a first plurality of frequencies; (b) determining for each frequency of the first plurality of frequencies an input impedance $Z_{2tr}$ of the LUT at said frequency in response to the electrical stimulation at said frequency; (c) determining values for at least two of Rs, Cs, Rp and Cp from $Z_{2tr}$ at each frequency of the first plurality of frequencies, wherein Rs and Cs are the corresponding series RC equivalent components of $Z_{2tr}$ and Rp and Cp are corresponding parallel RC equivalent components of $Z_{2tr}$; (d) determining a first value insertion loss of the LUT as a function of a value of one of Rs, Cs, Rp and Cp determined at one frequency of the first plurality of frequencies and a value of another one of Rs, Cs, Rp and Cp at another frequency of the first plurality of frequencies; (e) electrically stimulating the LUT at a second plurality of frequencies; (f) determining for each frequency of the second plurality of frequencies an input impedance Zin of the LUT at said frequency in response to the electrical stimulation at said frequency and a length (d) of the LUT as a function of Zin at said frequency; (g) determining for each frequency of a subset of the second plurality of frequencies a running standard deviation of the length d of the LUT, wherein the running standard deviation for each frequency is determined as a function of the lengths d determined at and below said frequency; (h) determining which pair of adjacent frequencies of the subset of the second plurality of frequencies where the largest difference between running standard deviations occurs; (i) determining a mean length (dm) of the LUT as a function of the lengths d of the LUT determined for each frequency at and below one of said pair of adjacent frequencies; (j) determining a gauge of the LUT as a function of the running standard deviation of the one of said pair of adjacent frequencies; (k) determining a second value insertion loss of the LUT as a function of the gauge and the mean length dm; and (l) comparing the values of the first and second insertion losses to an expected insertion loss value for the LUT and for designating one of said first, second and expected insertion loss values as the actual insertion loss value for the LUT.

The step of determining the input impedance $Z_{2tr}$ of the LUT at each frequency of the first plurality of frequencies can further include canceling out the effect of a test path disposed between the low frequency test hardware and the LUT on said determination at each frequency.

The step of canceling out the effect of the test path can include determining open circuit, short circuit and resistive termination responses of the test path to electrical stimulus at each frequency of the first plurality of frequencies; determining at least one compensation constant for each frequency of the first plurality of frequencies; and mathematically combining the at least one compensation constant for each frequency of the first plurality of frequencies with a corresponding value of $Z_{2tr}$ measured at said frequency to obtain the value of $Z_{2tr}$ at said frequency that is utilized to determine the values for at least two of Rs, Cs, Rp and Cp at said frequency.

The step of determining the input impedance Zin of the LUT at each frequency of the second plurality of frequencies can include canceling out the effect of a test path disposed between the low frequency test hardware and the LUT on said determination at each frequency.

The step of canceling out the effect of the test path can include determining open circuit, short circuit and resistive termination responses of the test path to electrical stimulus at each frequency of the second plurality of frequencies; determining at least one compensation constant for each frequency of the second plurality of frequencies; and mathematically combining the at least one compensation constant for each frequency of the second plurality of frequencies with a corresponding value of Zin measured at said frequency to obtain the value of Zin at said frequency that is utilized to determine the length d of the LUT at said frequency.

The invention is also a method of determining insertion loss of a telephone line under test (LUT). The method includes determining values of at least two of Rs, Cs, Rp and Cp at each frequency of a first plurality of discrete frequencies, wherein Rs and Cs represent an equivalent series RC input impedance of the LUT and Rp and Cp represent an equivalent parallel RC input impedance of the LUT; and determining an insertion loss value of the LUT as a function of a value of one of Rs, Cs, Rp and Cp determined at one frequency of the first plurality of frequencies and a value of another one of Rs, Cs, Rp and Cp at another frequency of the first plurality of frequencies.

The method can include predicting a length d of the LUT from at least one measurement of the LUT at each frequency of a second plurality of discrete frequencies; determining a running standard deviation of the length d of the LUT at each frequency of the second plurality of discrete frequencies, wherein the running standard deviation at each frequency is determined as a function of the predicted lengths d determined for the LUT at and below said frequency; determining a mean length (dm) of the LUT as a function of the lengths d of the LUT determined for each frequency at and below one frequency of a pair of adjacent discrete frequencies where the largest difference between running standard deviations occurs; determining a gauge of the LUT as a function of the running standard deviation the one of said pair of adjacent frequencies; and determining an insertion loss value of the LUT as a function of the gauge and the mean length dm.

The method can further include comparing the values of the first and second insertion losses to an expected insertion loss value for the LUT; and in response to said comparison, designating one of said first, second and expected insertion loss values as the actual insertion loss value for the LUT.

The invention is also a method of determining insertion loss of a telephone line under test (LUT). The method includes predicting a length d of the LUT from at least one measurement of the LUT at each frequency of a plurality of discrete frequencies; determining a running standard deviation of the length d of the LUT at each frequency of the plurality of discrete frequencies, wherein the running standard deviation at each frequency is determined as a function of the predicted lengths d determined for the LUT at and below said frequency; determining a mean length (dm) of the LUT as a function of the lengths d of the LUT determined for each frequency at and below one frequency of a pair of adjacent discrete frequencies where the largest difference between running standard deviations occurs; determining a gauge of the LUT as a function of the running standard deviation of the one of said pair of adjacent frequencies; and determining an insertion loss value of the LUT as a function of the gauge and the mean length dm.

The invention is also a system for determining insertion loss of a telephone line under test (LUT). The system includes means responsive to electrical stimulation of an input of the LUT at each frequency of a plurality of discrete frequencies for predicting a length d of the LUT at said frequency; means for determining a mean length (dm) and wire gauge of the LUT as a function of the length d of the LUT at each frequency of the plurality of discrete frequencies; and means for determining an insertion loss value of the LUT as a function of the gauge and the mean length dm.

The mean length (dm) and wire gauge of the LUT are determined as a function of one of: a running standard deviation of the length d of the LUT vs. frequency at each of the plurality of discrete frequencies; a variance of the length d of the LUT vs. frequency at each of the plurality of discrete frequencies; and a comparison of the length d of the LUT vs. frequency at each of the plurality of discrete frequencies to a length of a known cable vs. frequency.

The invention is also a method of determining insertion loss of a telephone line under test (LUT). The method includes the steps of: predicting a length d of the LUT at each frequency of a plurality of discrete frequencies as a function of an electrical stimulation of the LUT at said frequency; determining a mean length (dm) and wire gauge of the LUT as a function of the length d of the LUT at each frequency of the plurality of discrete frequencies; and determining an insertion loss value of the LUT as a function of the gauge and the mean length dm.

The invention is also a system for determining insertion loss of a telephone line under test (LUT). The system includes means responsive to electrical stimulation of an input of the LUT at each frequency of a first plurality of discrete frequencies for determining values of at least two of Rs, Cs, Ls, Gs, Rp, Cp, Lp and Gp, at each said frequency, wherein Rs, Cs, Ls and Gs represent equivalent series resistance, capacitance, inductance and conductance input values, respectively, of the LUT and Rp, Cp, Lp and Gp represent equivalent parallel resistance, capacitance, inductance and conductance input values, respectively, of the LUT; and means for determining an insertion loss value of the LUT as a function of a value of one of Rs, Cs, Ls, Gs, Rp, Cp, Lp and Gp determined at one frequency of the first plurality of frequencies and a value of another one of Rs, Cs, Ls, Gs, Rp, Cp, Lp and Gp at another frequency of the first plurality of frequencies.

Lastly, the invention is a method of determining insertion loss of a telephone line under test (LUT). The method includes determining values of at least two of Rs, Cs, Ls, Gs, Rp, Cp, Lp and Gp, at each frequency of a first plurality of discrete frequencies, wherein Rs, Cs, Ls and Gs represent equivalent series resistance, capacitance, inductance and conductance input values, respectively, of the LUT and Rp, Cp, Lp and Gp represent equivalent parallel resistance, capacitance, inductance and conductance input values, respectively, of the LUT; and determining an insertion loss value of the LUT as a function of a value of one of Rs, Cs, Ls, Gs, Rp, Cp, Lp and Gp determined at one frequency of the first plurality of frequencies and a value of another one of Rs, Cs, Ls, Gs, Rp, Cp, Lp and Gp at another frequency of the first plurality of frequencies.

BRIEF DESCRIPTION OF THE DRAWINGS

FIGS. 3a and 3b are flowcharts showing generally the steps for testing a telephone line when connected thereto via an intervening test path and directly, respectively;

DETAILED DESCRIPTION OF THE INVENTION

The present invention will be described with reference to the accompanying figures where like reference numbers correspond to like elements.

Figure 1:
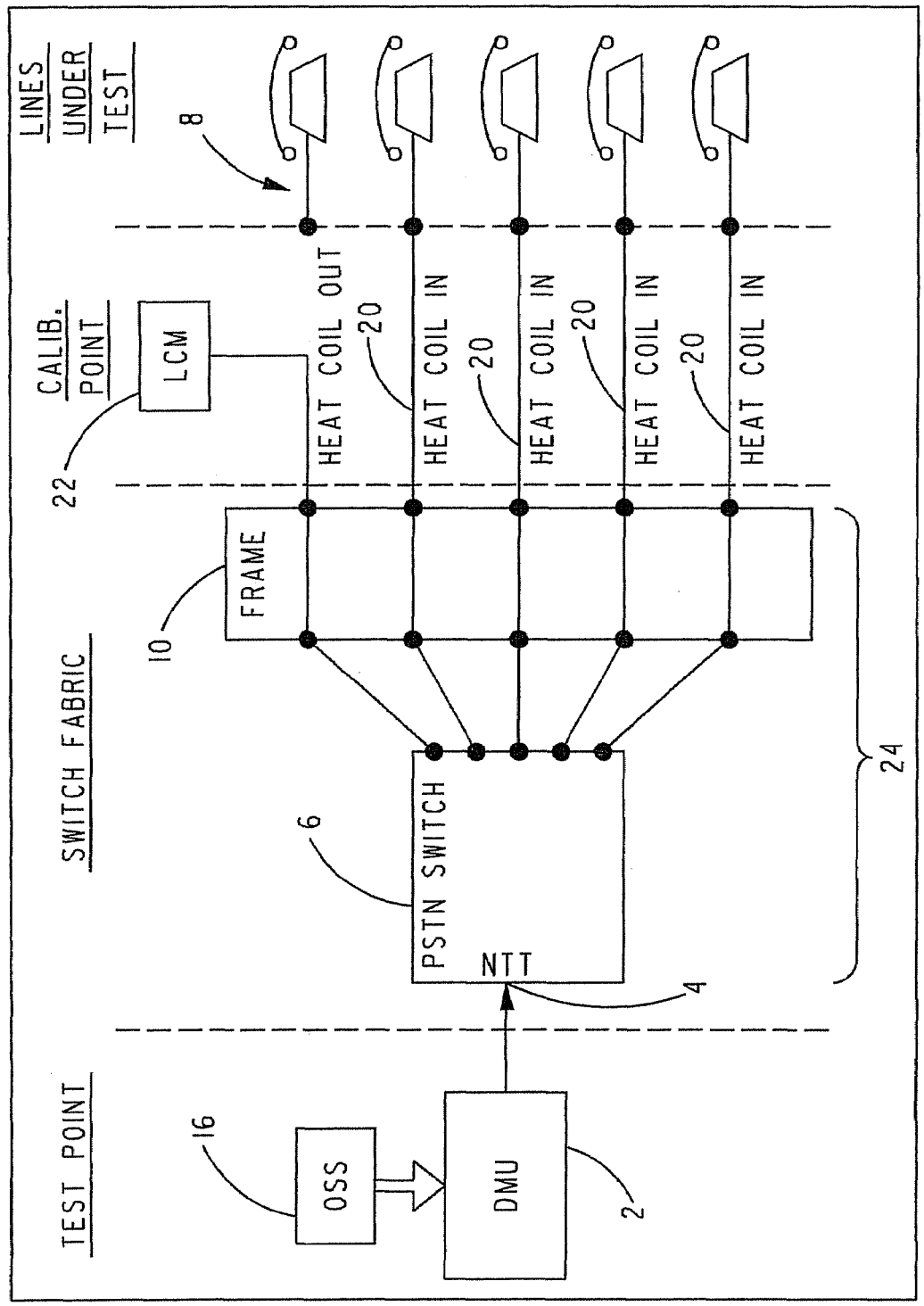
FIG. 1 is a diagrammatic view of a testing environment having a system (DMU) for testing telephone lines in accordance with the present invention.

With reference to FIG. 1, a digital measurement unit (DMU) 2 connects to an NTT interface 4 of a PSTN switch 6 which in turn has connections to many customer lines or lines under test (LUT) 8 via a Frame 10, one at a time of which the LUT may be selected for testing by DMU 2.

Figure 2:
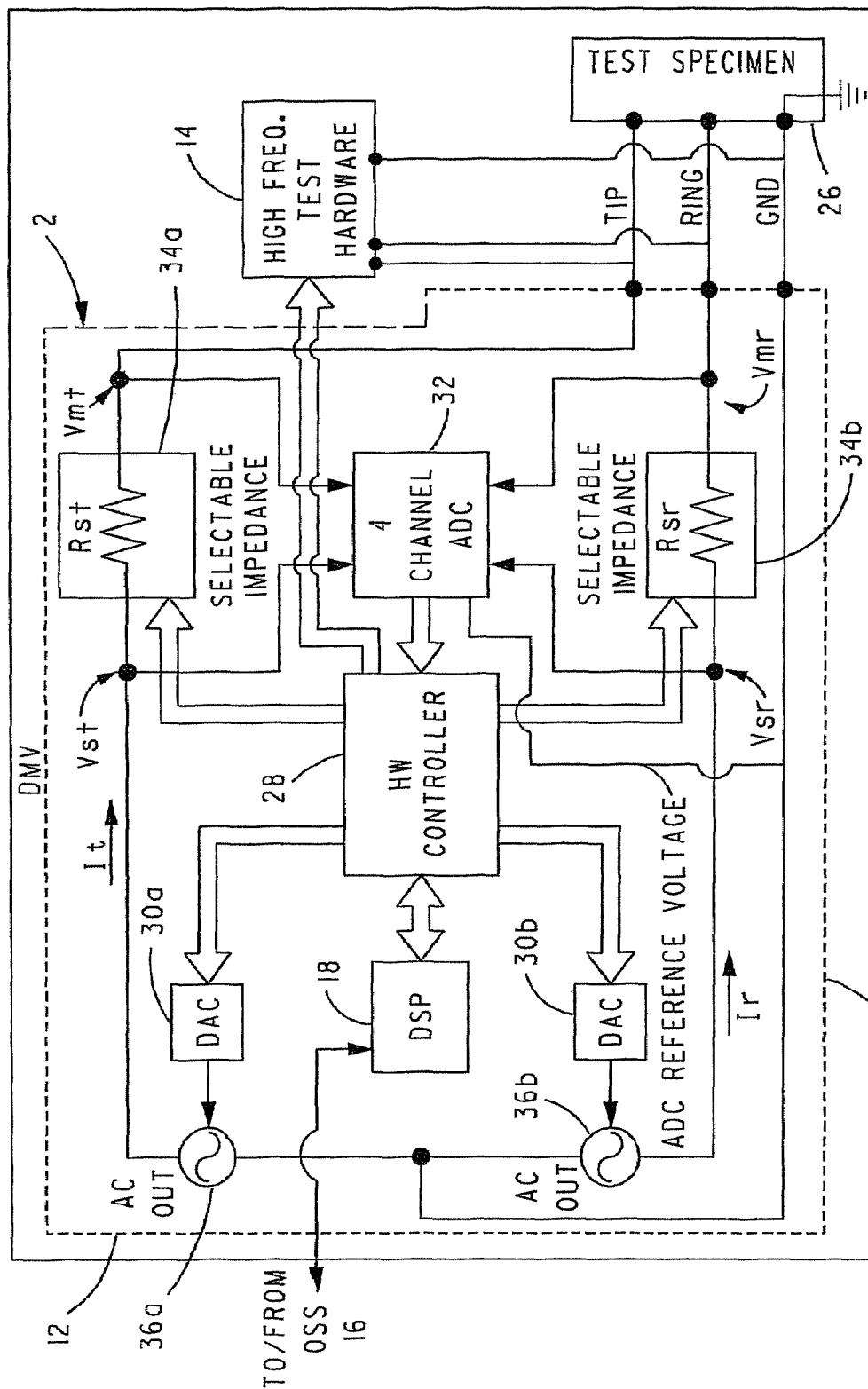
FIG. 2 is a diagrammatic view of the high frequency test hardware and the low frequency test hardware of the DMU of FIG. 1, wherein the latter includes in diagrammatic form the internal components thereof.

With reference to FIG. 2 and with continuing reference to FIG. 1, DMU 2 includes so-called "low frequency" test hardware 12 and so-called "high-frequency" test hardware 14. Low frequency test hardware 12 and high frequency test hardware 14 operate under the control of an Operations Support System (OSS) 16 via a Digital Signal Processor (DSP) 18 of DMU 2 that causes the low and high frequency test hardware 12 and 14 to perform desired measurements. DSP 18 then processes the measurements and returns measurement results and status to OSS 16.

Each connection to an LUT 8 can be made or broken at Frame 10 by the insertion or removal of a small lightning protection device known as a heat coil 20. A device called a Line Calibration Module (LCM) 22 (described in greater detail hereinafter) can be attached to one of the test paths after temporarily removing the appropriate heat coil 20. Through up-front attachment of LCM 22 to Frame 10 at various points, DMU 2 is able to measure—and later, calibrate out—the frequency response variations exhibited by the so-called switch fabric 24 which, as shown in FIG. 1, is comprised of PSTN switch 6 and Frame 10.

FIG. 1 represents an exemplary environment in which DMU 2 will operate—not the only one. DMU 2 may connect to a particular LUT 8 via some test path other than switch fabric 24. For example, it may also connect directly to LUT 8, in which case there is no test path at all. The calibration methods described herein will function no matter what the test path. Accordingly, herein, any suitable term describing the actual test path can be substituted in place of "switch fabric" and vice versa.

In FIG. 2, a test specimen or line 26 depicted connected to DMU 2 may be either a directly connected LUT 8 or an LUT 8 connected through some intervening test path e.g., PSTN switch 6. Low frequency test hardware 12 and high frequency test hardware 14 of DMU 2 connect to test specimen 26 at all three of its electrical points, Tip, Ring and Ground. Tip and Ring are service-carrying conductors, whereas Ground represents the metallic sheath of the cable carrying the Tip-Ring pair.

DSP 18 acts as the central controller for low frequency and high frequency test hardware 12 and 14. Acting via a Hardware Controller 28, DSP 18 utilizes dual Digital-to-Analog Converters (DACs) 30a and 30b of low frequency test hardware 12 to generate independent ground-referenced AC voltage stimuli on the Tip and Ring. Concurrently, highly synchronized channels of a 4-channel Analog-to-Digital Converter (ADC) 32 of low frequency test hardware 12 are used to make certain measurements. DSP 18 processes measurements made by the 4-channel ADC 32 to determine a first value insertion loss of the LUT 8.

Under the control of DSP 18, Hardware Controller 28 is also able to select, via selectable impedances 34a and 34b of low frequency test hardware 12, the Tip and Ring source impedances used when stimulating test specimen 26. This effectively implements a ranging feature whereby low frequency test hardware 12 can adapt itself to a wide variety of line conditions.

With reference to FIGS. 3a and 3b and with continuing reference to FIGS. 1 and 2, a technique for testing each test specimen 26, i.e., a directly connected LUT or an LUT connect through an intervening test path, is implemented in four major stages. In order of execution, they are Calibration, Measurement, Compensation, and Analysis stages 40, 42, 44 and 46, respectively. Despite being out of sequence, the Calibration and Compensation stages 40 and 44, respectively, go hand-in-hand, as do Measurement and Analysis stages 42 and 46, respectively. If test hardware 12 and 14 is set up to gain test access indirectly, e.g., through a switch fabric or some other test path, the technique shown in FIG. 3a applies and all four stages are used. If test hardware 12 and 14 effectively connects directly to the LUT, the technique shown in FIG. 3b applies and only two stages are required. These two stages, (Measurement and Analysis 42 and 46), comprise the core algorithm. The other two stages, (Calibration and Compensation 40 and 44), cancel out the unwanted effects introduced by the test path. The four stages will now be described in detail.

Figures 4A, 4B:
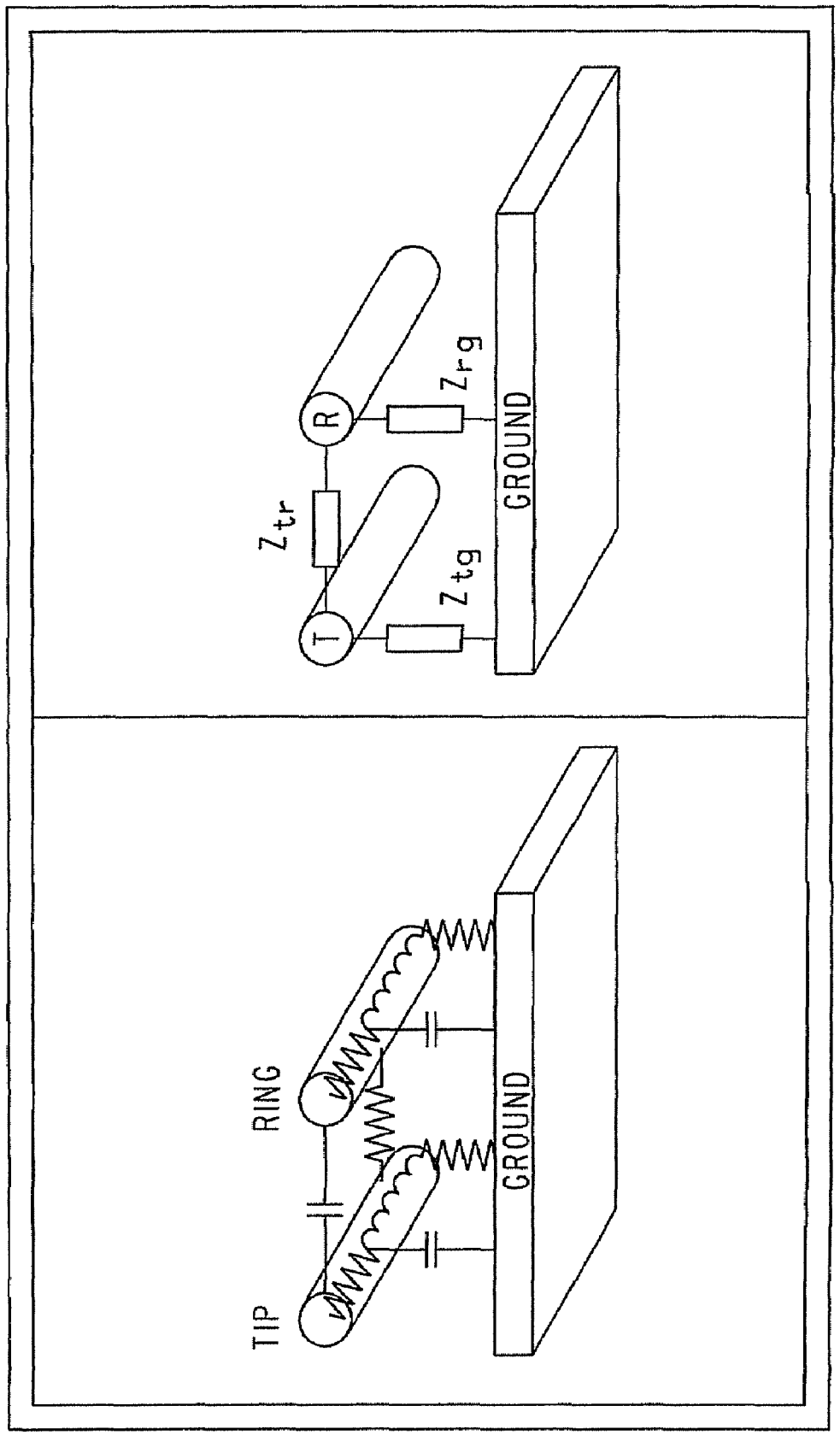
FIG. 4a is a stylized perspective view of a typical telephone line showing the equivalent resistive and capacitive components thereof extending between each conductor.
FIG. 4b is a stylized perspective view of the telephone line shown in FIG. 4a wherein the equivalent resistive and capacitive elements between each pair of conductors is expressed in terms of their complex impedance equivalent.

Measurement Stage-Low Frequency Test Hardware:

With reference to FIGS. 4a and 4b, and with continuing reference to all previous Figs., three conductors comprise each test specimen 26—Tip, Ring, and Ground. Although Tip and Ring are depicted as being straight and separated, in reality they are insulated and twisted together. Similarly, the actual ground conductor is not a plane, as depicted, but rather more like a hollow cylinder wrapped around the Tip and Ring conductors. Nonetheless, at any given frequency, a steady-state complex impedance exists between each pair of conductors. The tip-to-ring impedance will be called $Z_{tr}$. Tip-to-ground and Ring-to-ground impedances will be called $Z_{tg}$ and $Z_{rg}$, respectively. These are the driving-point three-terminal impedances seen when looking into test specimen 26 modeled as a delta network.

Ideally, an unterminated line would exhibit no admittance anywhere and all impedances would be infinite in magnitude. Such a line would have zero insertion loss at all frequencies. In practice, as the line length approaches zero, the impedances do indeed approach infinity and insertion loss values do approach zero. However, with any non-zero line length, the impedances are finite and measurable. These impedances are also complex, in that they have both resistive and reactive components. The resistive components come from series resistances in the conductors, and from parallel conductances in the insulators. The reactive components come from parallel capacitive effects between the conductors, and series inductive effects within them.

Each of these effects has a predictable impact upon measured impedances. Given a fixed gauge of wire, the magnitude of each effect tends to vary directly with the length of the line. Conversely, given a fixed length of wire, these effects tend to either remain constant or vary inversely with wire gauge. Notably, these very same relationships also apply to insertion loss. That is, all else being equal, insertion loss tends to be proportional to length and inversely proportional to gauge. This is no coincidence, because the same physical effects that cause non-infinite impedances also cause non-zero insertion loss.

The overall approach of the present invention capitalizes on the similar impact the described physical effects have on both driving point impedances (which can be directly measured single-endedly) and insertion loss (which cannot). Initially, attempts were made to relate impedances and insertion loss analytically. This proved to be impractical. While proportional relationships exist in both cases, the coefficients of proportionality are different. Further, simple proportional equations only approximate the observed behavior, and only after many unknown variables are held constant. Other factors also come into play which thoroughly confound any purely analytical approach. These factors include, without limitation, the temperature of the line, the fact that most actual telephone lines are comprised of multiple segments of cable of different gauges, and the fact that bridged taps may be present. Each of these factors affects both the impedance and insertion loss, but not in any easily relatable way.

Figure 5:
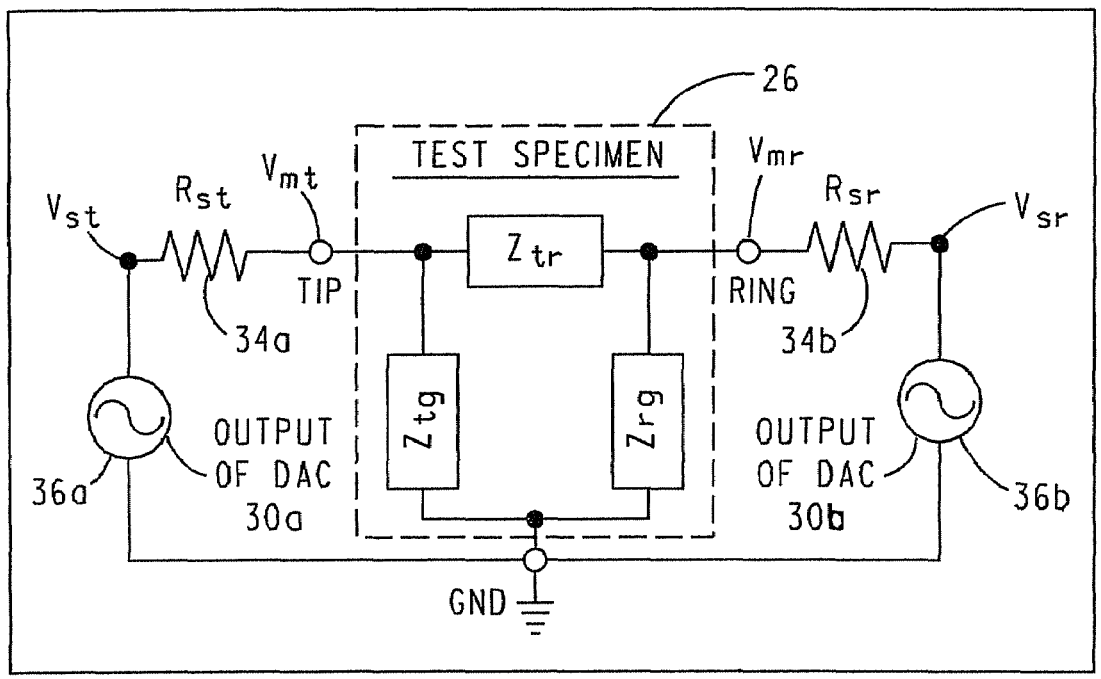
FIGS. 5 and 6 are isolated diagrammatic views of the outputs of the DACS shown in FIG. 2 applied to equivalent delta and Y three terminal impedance networks, respectively, of the test specimen of FIG. 2 via the selectable impedances shown in FIG. 2.

Given the impracticality of relating impedances to insertion loss analytically, statistical techniques were devised to relate them. These techniques are described hereinafter. The objective of Measurement Stage 42 utilizing low frequency test hardware 12 is to solve the three-terminal impedance model of test specimen 26 at a plurality of different frequencies distributed, desirably uniformly, between 100 Hz and 7000 Hz. In one non-limiting embodiment, the plurality of different frequencies include 100 Hz, 200 Hz, 300 Hz, . . . , 7,000 Hz. However, this is not to be construed as limiting the invention since it is envisioned that more or less of these frequencies or different frequencies can be utilized as deemed necessary and/or desirable by one of ordinary skill in the art. These frequencies are utilized because they will pass through switch fabric 24 relatively unaffected, and provide a high degree of measurement repeatability and immunity from variations of PSTN switch 6. FIG. 5 illustrates the electrical circuit formed when attaching low frequency test hardware to test specimen 26. The three-terminal impedance delta model is readily apparent. As discussed above, test specimen termination 26 may be LUT 8 itself, LUT 8 as viewed through an intervening test path, or when calibrating, it may be the test path with an LCM termination described hereinafter.

Figure 6:
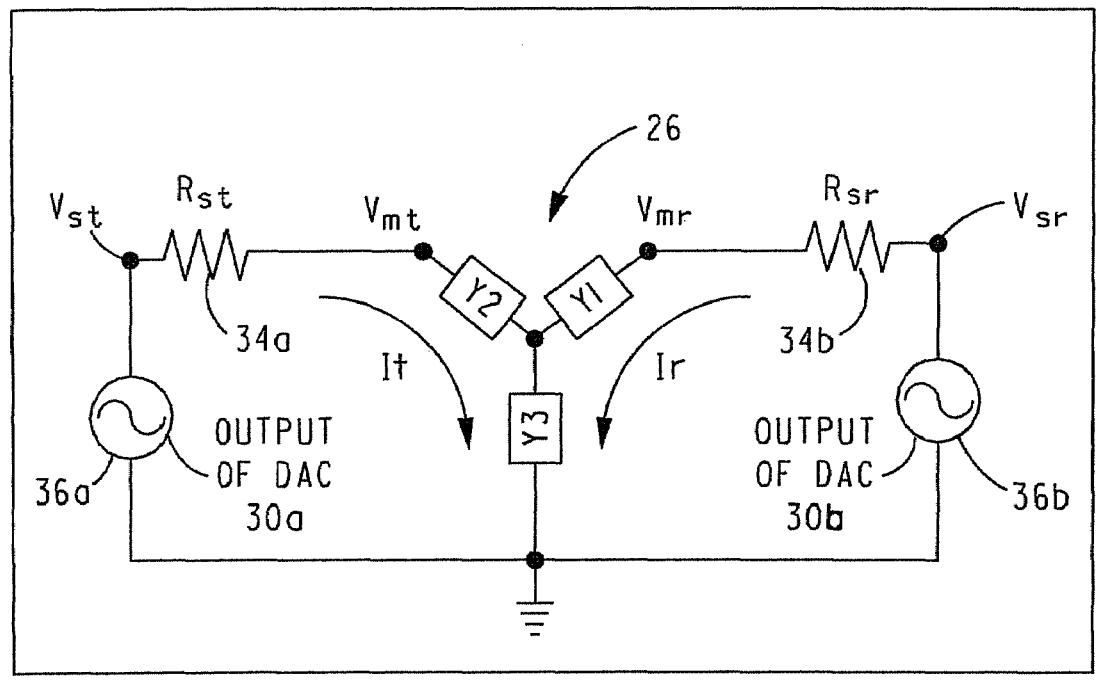

As is well known in the art of electrical engineering, for any three-terminal impedance network with a Δ (delta) configuration, there exists an electrically equivalent network having a Y configuration, and vice versa. Often, circuit analysis is simpler by replacing one type of network with the other type of network, solving the system, and later transforming the other type of network back to its equivalent counterpart. This is one such case. FIG. 6 illustrates the electrical circuit of FIG. 5 represented as a Y-network, and with all nodes and circuit elements labeled.

In operation, DSP 18 establishes the source impedances Rst and Rsr via selectable impedances 34*a* and 34*b*, respectively, of low frequency test hardware 12. DSP 18 also establishes the two AC stimuli 36*a* and 36*b*, which are pure sinusoids at each frequency of interest, via DACs 30*a* and 30*b*, respectively, flow frequency test hardware 12. Once the circuit reaches steady state, DSP 18 uses 4-channel ADC 32 to capture voltages Vst, Vmt, Vmr, and Vsr as shown in FIGS. 5 and 6. These voltages are all desirably sampled simultaneously, or as near to simultaneously as practicable, to avoid undesired phase differences. DSP 18 then separates these voltages into their real and imaginary components for algebraic processing. The real and imaginary components of currents It and Ir which flow through resistors Rst 34*a* and Rsr 34*b*, respectively, are determined from voltages Vst, Vmt, Vsr, and Vmr, and the values of resistors Rst 34*a* and Rsr 34*b* in a manner known in the art, e.g., It=(Vst−Vmt)/Rst. This process is repeated for each distributed frequency of interest and a set of values for It, Ir, Vst, Vmt, Vmr and Vsr are stored for subsequent retrieval and analysis for each distributed frequency of interest.

The only unknowns in the circuit of FIG. 6 are the Y-network impedances Y1, Y2 and Y3. DSP 18 determines these by having DACs 30*a* and 30*b* apply a stimulus test specimen 26 at each distributed frequency, having 4-channel ADC 32 acquire voltage Vst, Vmt, Vsr and Vmr for each stimulus and solving a system of linearly independent complex equations derived using Kirchhoff's current law. Once Y-network impedances Y1, Y2 and Y3 are known for each distributed frequency, the desired impedance values Ztg, Zrg and Ztr for each distributed frequency are calculated by performing a Y-Δ transformation.

This technique is repeated to obtain values of Ztg, Zrg, and Ztr for each distributed frequency.

Analysis Stage-Low Frequency Test Hardware:

Prior to developing the method described herein, a large number of real world lines were studied. These included many different combinations of length and gauge makeup, with and without bridged taps, and with or without various CPE (Customer Premise Equipment) terminations. Impedance sweep triplets, i.e., impedances Ztr, Ztg and Zrg, were collected for each distributed frequency after direct connection of the test apparatus to each configuration along with actual double-ended 300 kHz insertion loss readings. The data was subjected to statistical analysis, during which strong interrelationships were later found.

The inputs to Analysis stage 46 are the three impedance sweeps Ztg, Zrg, and Ztr for each distributed frequency that would be seen when directly connecting to the LUT 8. If a direct connection actually exists, these will come from Measurement stage 42. Otherwise, they will be provided by the Compensation stage 44 (to be described in greater detail hereinafter).

Ztg(f), Zrg(f) and Ztr(f) are the solutions over frequency, at each distributed frequency f to an impedance delta model of the LUT alone. The measurement of Ztg, Zrg and Ztr at each distributed frequency provides useful data about the LUT. Before attempting to determine the first value insertion loss, certain other criteria are first checked. For example, the LUT can be checked for resistive and capacitive balance between the Tip and Ring. Each Ztg and Zrg impedance point is modeled as a parallel RC circuit and solved for the series resistance and capacitance. A fault or imbalance can be reported to the OSS 16 upon detection of any significant deviation in the resistance or capacitance between Tip and Ring. The presence of load coils, POTS splitters and other devices which are desirably not present on the test path, can also be detected and reported to the OSS 16.

After passing these preliminary tests, the first value 300 kHz insertion loss is obtained as follows. First, the equivalent two-terminal impedance $Z_{2TR}$ is calculated at each distributed frequency. This is the net impedance seen looking across only the Tip and Ring terminals of the LUT, calculated utilizing the following equation 1:

$$Z_{2TR}(f)=Ztr(f)+(Ztg(f)\|Zrg(f)). \tag{EQ1}$$

Next, the value of Ztr at each distributed frequency (or each point in $Z_{2TR}(f)$) is modeled as a series RC circuit and solved for the component values Rs and Cs. It is also modeled as a parallel RC circuit and solved for its parallel values Rp and Cp. The values of Rs, Cs, Rp and Cp at a subset (all or less than all) of the distributed frequencies are then plugged into the following equation EQ2 and used to directly compute the first value insertion loss.

The following multi-predictor regression equation 2 (EQ2) was found to work quite well for determining the first value insertion loss:

$$y = \sum_{k=1}^{N} a_k x_k^{b_k} \tag{EQ2}$$

where y is the predicted variable (the first value insertion loss) and $x_1 \ldots x_N$ are the predictors.

The initial guesses for the predictors were values chosen from the values of Rs, Cs, Rp, and Cp at various frequencies (a subset of the distributed frequencies) where correlations seemed strongest and most immune from undesirable effects due to varying CPE devices. In one, exemplary non-limiting embodiment, all possible combinations of 2, 3 and 4 of the values of Cs, Rs, Rp and Cp acquired at the various distributed frequency are formed into so-called data points, each of which comprised a value of Rs at a first frequency, a value of Cs at a second frequency, a value of Rp at a third frequency, and/or a value of Cp at a fourth frequency, wherein each of the first through fourth frequencies can be any one of the distributed frequencies.

Least squares analysis was then performed for all of these data points to determine which data point has the smallest least squares error. The values of Rs, Cs, Rp and/or Cp included in this data point are then substituted for the values of predictors x in equation EQ2 which is then solved for a predetermined predicted value of variable y to obtain the values of coefficients a for the best possible fit to all measured data. For example, if it is determined that the data point having the least squares error includes the values of Rp at 300 Hz, Cs at 1,100 Hz, Rs at 800 Hz and Cp at 4,600 Hz, then these values of Rp, Cs, Rs, and Cp are substituted for predictors $x_1$, $x_2$, $x_3$, and $x_4$, respectively, in equation EQ2 which is then solved for a predetermined value of Y to obtain values for $a_1$ through $a_4$ and $b_1$ through $b_4$.

After determining the optimum values for the a and b coefficients and the frequency associated with each x predictor value e.g., 300 Hz for Rp=$x_1$; 1,100 Hz for Cs=$x_2$; 800 Hz for Rs=$x_3$; and 4,600 Hz for Cp=$x_4$, DSP 18 is programmed with these optimum values and the summation equation above, thus completing the implementation of the Analysis stage.

In operation, low frequency test hardware 12 obtains values of Rs, Cs, Rp and Cp from test specimen 26 at the same frequencies where values for like variables were acquired for the data point determined to have the least squares error. For example, if the values of Rp, Cs, Rs, and Cp for the data point having the least squares error occurred at 300 Hz, 1,100 Hz, 800 Hz and 4,600 Hz, respectively, during operation, low frequency test hardware 12 acquires values of Rp, Cs, Rs and Cp from test specimen 26 at 300 Hz, 1,100 Hz, 800 Hz and 4,600 Hz, respectively. These thus acquired values of Rp, Cs, Rs and Cp are substituted for predictors $x_1$, $x_2$, $x_3$ and $x_4$ in equation EQ2 which is then solved to determine a value of y, namely, the first value insertion loss.

In the foregoing description, it was assumed that a data point having values for Rp, Cs, Rs and Cp was the data point having the least squares error. However, this is not to be construed as limiting the invention since as many of two of variables Rp, Cs, Rs and Cp can have a value of zero and no frequency associated therewith. Accordingly, the description herein of acquiring values for all four of Rp, Cs, Rs and Cp at different frequencies is not to be construed as limiting the invention.

DMU 2, therefore, is a trained system armed with a regression model well suited for the problem.

Calibration Stage:

Calibration stage 40 can be omitted if low frequency test hardware 12 can effectively make direct connections to an LUT 8. Otherwise, the impedance effects of the intervening switch fabric 24 or other test path must be measured and later taken into consideration to prevent inaccurate insertion loss results. Calibration stage 40 is concerned with making these test path measurements. Compensation stage 44, discussed hereinafter, utilizes data acquired in Calibration stage 40 to negate the effects of the test path. Unlike the other stages, Calibration stage 40 is executed only once, prior to any actual insertion loss measurements.

To accomplish test path measurements, LCM 22, described in greater detail hereinafter, can be used in combination with low frequency test hardware 12. Prior to running an insertion loss measurement on any LUT 8, LCM 22 is attached at Frame 10 at least once, desirably to one of the ends of Frame 10. As depicted in FIG. 1, where LCM 22 is connected to Frame 10, the corresponding heat coil 20 is removed thus disconnecting the corresponding LUT 8 from the Frame 10. LCM 22 is attached to terminate the test path through switch fabric 24. LCM 22, which is controlled by analog signaling from low frequency test hardware 12 in a manner to be described hereinafter, is able to cause any of number different terminations to appear across the Tip and Ring terminals of DMU 2. These terminations include, without limitation, open-circuit, short-circuit, nominal 160 ohms, and nominal 900 ohms.

Calibration stage 40 proceeds as follows. Initially, LCM 22 is connected to Frame 10 at a desired position. Next, the OSS 16 invokes the calibration function in low frequency test hardware 12. When this occurs, low frequency test hardware 12 acquires a $Z_{2TR}$ value for each termination, namely, open-circuit, short-circuit, nominal 160 ohm representative and nominal 900 ohm resistance, at each distributed frequency. At the end of the Calibration Stage 90, the three $Z_{2TR}$ values obtained at each distributed frequency are stored for later retrieval and/or analysis.

This process is then repeated on a sufficient number of LCMs 22 connected to different points on LUT 8 side of Frame 10 to cover all possible test paths that are likely to vary through switch fabric 24. This does not mean every telephone number, but in the worst case it could mean every line unit (not shown) in PSTN switch 6 (each line unit serves multiple telephone numbers). In the case of a Lucent 5ESS switch, two calibrations may even be required on the same line unit, reflecting the fact that two different test paths are possible.

In many installations, the impedance variations caused by different test paths will not be significant enough to notably affect insertion loss measurements or justify multiple calibrations. In these cases, a single calibration may suffice to represent many or all paths. This technique affords the flexibility to choose how much up-front calibration time to invest for extra insertion loss accuracy later. In other words, the mapping between test paths and calibration sets may be (in order of decreasing accuracy) one-to-one, many-to-one, or all-to-one.

Calibration stage 40 can be considered finished once a) all desired calibration measurement sets have been obtained, b) all desired test paths have been mapped, and c) the mappings have been stored.

The use of LCM 22 with low frequency test hardware 12 to perform Calibration stage 40 is not to be construed as limiting the invention since the functions of LCM 22, namely, the provisioning of an open circuit, short circuit and a fixed 900 ohm resistance to the Tip and Ring connection point on the LUT 8 side of frame 10, can be performed by any other suitable module or by a service technician.

Compensation Stage:

The function of Compensation stage 44 is to cancel out the impedance effects of the test path. More specifically, given a $Z_{2TR}(f)$ measurement of an LUT 8 at a particular distributed frequency as viewed though a test path, plus a calibration data set for that test path at said distributed frequency, the $Z_{2TR}(f)$ measurement that would have been obtained had LUT 8 been directly attached to DMU 2 can be determined. Once this is accomplished, Analysis stage 46 can be applied to obtain the insertion loss for LUT 8.

Compensation stage 44 can be omitted if the test apparatus is in-fact directly connected to the LUT 8. Otherwise, when the insertion loss measurement is invoked in low frequency test hardware 12, the appropriate calibration data set collected in Calibration stage 40 is provided, based on the mappings that were established in that stage.

The calibration data set consists of three $Z_{2TR}(f)$ impedance values at each distributed frequency, one for each termination (i.e., open circuit, short circuit and a fixed 900 ohm resistance) applied by LCM 22 to the far end of the test path. These will be called Zs, Zo, and Zr for short circuit, open circuit, and resistive (fixed 900 ohm resistance). The resistive termination value will be called Rterm. (Rterm=900). Finally, Zm will be given to the $Z_{2TR}(f)$ measurement of the test path plus the LUT 8, which is provided by Measurement stage 42. Given all of this data, the $Z_{2TR}(f)$ value of the LUT at each distributed frequency can be determined utilizing the following equation 3 (EQ3):

$$Z_{2TR}(f) = \frac{B(f) - [D(f)*Zm(f)]}{[C(f)*Zm(f)] - A(f)}, \quad (EQ3)$$

where $$A(f) = \frac{1 - [Zs(f)/Zr(f)]}{1 - [Zs(f)/Zo(f)]};$$

$$B(f) = Rterm * \frac{[Zo(f)/Zr(f)] - 1}{[Zo(f)/Zs(f)] - 1};$$

-continued $$C(f) = \frac{1 - (Zs(f)/Zr(f))}{Zo(f) - Zs(f)}; \text{ and}$$

$$D(f) = Rterm * \frac{[Zo(f)/Zr(f)] - 1}{Zo(f) - Zs(f)}.$$

A(f), B(f), C(f) and D(f) are compensation constants at each distributed frequency utilized to determine the value of $Z_{2tr}(f)$ in equation EQ3 at said frequency.

After completing Measurement stage 42, DSP 18 applies equation EQ3 to compute what the $Z_{2TR}(f)$ impedance of the LUT 8 would look like at each distributed frequency if the low frequency test hardware were directly connected to it. Then, the optimum values for the a and b coefficients and x predictor values of equation EQ2 are determined from the values of $Z_{2TR}(f)$ and, more particularly, from the values of Rs(f), Cs(f), Rp(f) and Cp(f) determined from the value of $Z_{2TR}(f)$ at each distributed frequency in the manner discussed above in connection with Analysis stage 46. Equation EQ2 can then be solved in the manner discussed above in connection with Analysis stage 46 to return the first value insertion loss.

Figure 7:
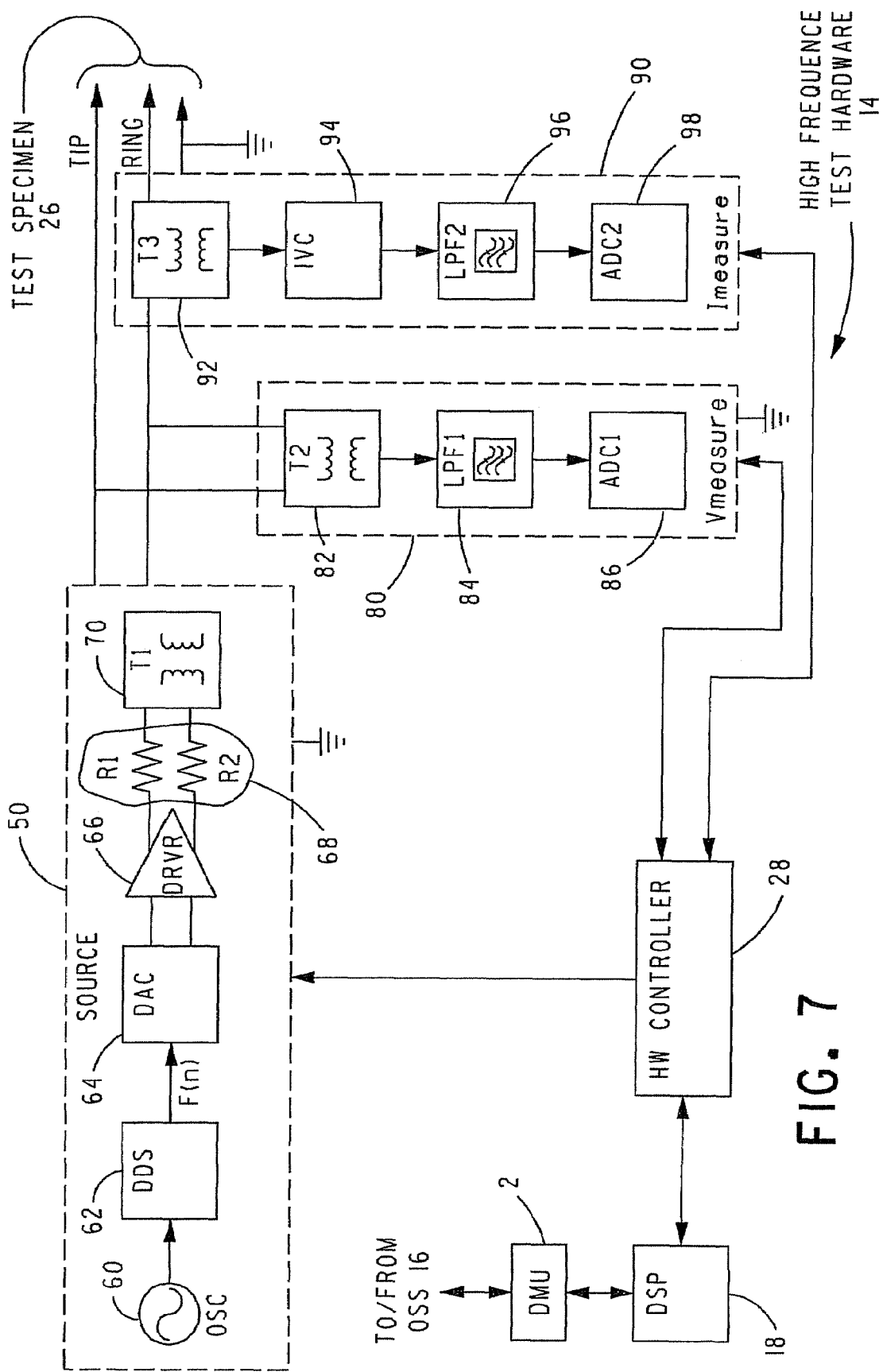
FIG. 7 is an isolated diagrammatic view of the high frequency test hardware of FIG. 2.
Figure 8:
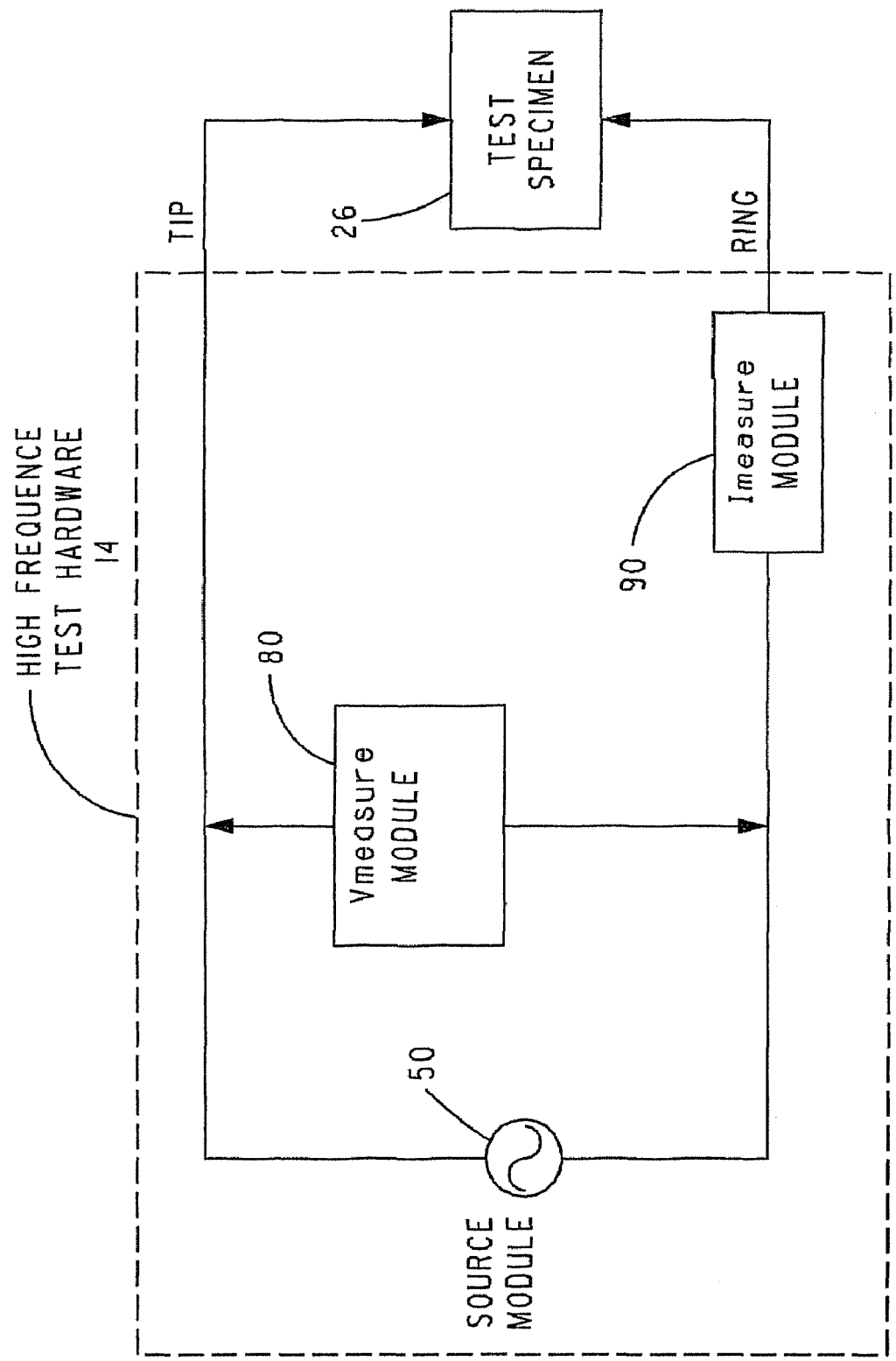
FIG. 8 is a simplified diagrammatic view of the high frequency test hardware of FIG. 7.

High Frequency Test Hardware:

High frequency test hardware 14 shown in FIG. 2 can be connected to test specimen 26, such as a directly connect LUT 8 or an LUT 8 connected through some intervening test path. With reference to FIGS. 7 and 8, high frequency test hardware 14 includes a Source block 50, a Vmeasure block 52 and an Imeasure block 54. Source block 50, Vmeasure block 52 and Imeasure block 54 are connected to HW controller 28 described above in connection with low frequency test hardware 12 in FIG. 2. Source block 50, Vmeasure block 52 and Imeasure block 54 operate under the control of DSP 18 via HW controller 28 of the low frequency test hardware 12 disclosed in FIG. 2. DSP 18 operates in response to command and control signals received from the OSS.

DSP 18 and HW controller 28 shown in FIG. 7 are the same as those shown in FIG. 2 in connection with low frequency test hardware 12 and thus comprise part of low frequency test hardware 12 and high frequency test hardware 14. However, this is not to be construed as limiting the invention since separate DSPs and/or HW controllers can be provided for both low frequency test hardware 12 and high frequency test hardware 14.

Source block 50 includes an oscillator (OSC) 60, a direct digital synthesis (DDS) chip 62, a digital-to-analog converter (DAC) 64, a differential line driver (DRVR) 66, matching resistors R1 and R2 68, and a line transformer T1 70 all connected as shown in FIG. 7. OSC 60 is a digital clock that provides a reference frequency for DDS 62 as well as the digital clock for driving DAC 64 and the analog-to-digital converters (ADCs) 86 and 98 (discussed hereinafter) of the Vmeasure block 80 and the Imeasure block 90 (discussed hereinafter). DDS 62 generates a frequency sweep (n) in discrete steps in digital form which drives DAC 64. HW controller 28 controls the operation of DDS 62 as well as the operation of DAC 64 and ADCs 86 and 90. DAC 64 converts the digital data received from DDS 62 for each discrete frequency into a differential analog waveform which is provided to an input of DRVR 66. DRVR 66 is a differential-in differential-out line driver which is coupled to test specimen 26 via line transformer T1 70 through matching resistors R1 and R2 68 which act as source impedances similar to Rst 34a and Rsr 34b in FIG. 2. Transformer T1 70 is a coupling transformer which impedance transforms the resistance of resistors R1 and R2 68 to match the input impedance of test specimen 26, namely, 160 ohms, provides a voltage step-up, provides differential-in differential-out coupling and provides galvanic isolation between the electronic hardware of source block 50 and test specimen 26.

Vmeasure block 80 includes a transformer T2 82, a first low pass filter (LPF1) 84 and a first analog-to-digital converter (ADC1) 86. Vmeasure block 80 measures the complex (i.e., real and imaginary) voltage applied by Source block 50. Transformer T2 82 is a step down transformer which provides galvanic isolation between test specimen 26 and the electronic elements of the Vmeasure block 80, impedance transforms the input impedance of LPF1 84 to a higher value, steps the voltage down to within the range of ADC1 86 and provides a differential-in to single-ended conversion. The output voltage of transformer T2 82 is low pass filtered by LPF1 84, to remove alias frequency components, and then converted from an analog signal into a corresponding digital value via ADC1 86. HW controller 28 passes the digital value of the voltage to the DSP 18.

Imeasure block 90 includes a transformer T3 92, a current to voltage converter (IVC) 94, a second low pass filter (LPF2) 96 and a second analog-to-digital converter (ADC2) 98. Imeasure block 90 measures the complex (i.e., real and imaginary) current flowing as a result of the voltage output by Source Block 50 and the impedance of test specimen 26. Transformer T3 92 is a current transformer which provides galvanic isolation between the electronic components of Imeasure block 90 and test specimen 26, impedance transforms a low impedance of IVC 94 to an even lower value as seen by test specimen 26 and steps the current down to within the range of IVC 94. As connected in FIG. 7, Imeasure block 90 is in series with test specimen 26 from the perspective of Vmeasure block 80. Accordingly, any voltage drop across Imeasure block 90 caused by the resistance of IVC 94 will introduce an error term. The solution to this error is provided by the combination of transformer T2 82 and IVC 94. Specifically, transformer T3 92 reflects input impedance of IVC 94 to test specimen 26 with a transform of 1/100. The input impedance of IVC 94 is desirably less than 100 ohms which therefore transforms to less than 1 ohm on test specimen 26 side of transformer T3 92. Desirably, IVC 94 is a current-to-voltage converter implemented via a current feedback amplifier (CFA) in an inverter configuration. However, this is not to be construed as limiting the invention since it is envisioned that IVC 94 can be implemented in any suitable and/or desirable manner deemed suitable by one of ordinary skill in the art, including, without limitation, a resistor. For purpose of describing the present invention, it will be assumed that IVC 94 is comprised of a CFA.

A negative input of the CFA is low impedance and any current flowing into this negative input causes the CFA to output a current to match the input current (the output current is inverted with respect to the input current). The output current flows through a feedback resistor of the CFA whereupon the output voltage equals the output current flowing through the feedback resistor multiplied by the value of the feedback resistor. Transformer T3 92 reduces the test specimen 26 side current by a factor of 10 at the CFA. Therefore, IVC 94 in combination with transformer T3 92 produces a current-to-voltage conversion of: (I)(input impedance of test specimen 26)/(10)(x) (where x=the resistance of the feedback resistor of the CFA).

The output voltage of IVC 94 is low pass filtered by LPF2 96 to remove alias frequency components and then converted from an analog signal to a digital signal via ADC2 98. If high frequency test hardware 14 is not connected to test specimen 26, it is necessary to perform Calibration stage 40 and Compensation stage 44 described above with high frequency test hardware 14 at many different frequencies distributed, desirably uniformly between 1 kHz and 120 kHz. In one non-limiting embodiment, high frequency test hardware 14 utilizes many different frequencies distributed uniformly at approximately 610.4 Hz increments between 1,220.7 Hz and 119600 Hz, inclusive. However, this is not to be construed as limiting the invention. This is in contrast to the low frequency test hardware 12 which utilizes many different frequencies distributed uniformly at 100 Hz increments between 100 Hz and 7 kHz, inclusive.

Measurement Stage-High Frequency Test Hardware:

High frequency test hardware 14 can be utilized to measure the input impedance of test specimen 26, i.e., a twisted pair of cables, e.g., a Tip and a Ring, via the voltage and current method. In operation, high frequency test hardware 14 is connected to test specimen 26 in order to determine the input impedance thereof, in this case a Tip, Ring and Ground and any intervening test path, e.g., switch fabric 24. For purpose of describing how high frequency test hardware 14 implements measurement stage 42, it will be assumed hereinafter, unless expressly set forth, that test specimen 26 is an LUT 8 directly connected to high frequency test hardware 14 without any intervening test path. Source module 50 of high frequency test hardware 14 then applies to test specimen 26 a plurality of signals at a plurality of different frequencies distributed, desirably uniformly, between 1 kHz and 120 kHz. After a sufficient settling time at each distributed frequency, Vmeasure module 80 and Imeasure module 90 of high frequency test hardware 14 collect voltage and current data, respectively. A fast Fourier transform (FFT) is performed on both the voltage and current data acquired at each distributed frequency and the appropriate magnitude and phase is obtained from the FFT array for said frequency. The input impedance at each frequency is calculated utilizing the equation Zin=V) I, where V is the magnitude and phase of the voltage and I is the magnitude and phase of the current. This information is stored in an input impedance array for each distributed frequency.

Analysis Stage-High Frequency Test Hardware:

The input impedance array is then used to solve for the distance and the American Wire Gauge (AWG) of the LUT. The input impedance is related to the LUT via the two port model of a twisted pair cable LUT utilizing the following equation 4 (EQ4):

$$Zin = \frac{A + B/Zload}{C + D/Zload} \quad (EQ4)$$

where A=cos h($\gamma$d);
B=Zo sin h($\gamma$d);
C=1/Zo sin h($\gamma$d);
D=cos h($\gamma$d);
d=estimated loop length (or distance)
$\gamma$=propagation constant of 24 or 26 AWG wire;
Zo=characteristic impedance for 24 or 26 AWG; and
Zload=terminating impedance of the twisted pair cable LUT.

For effectively open ended LUTs, Zload is very large so Zin reduces to:

$$Zin=Zo*\cos h(\gamma d)/\sin h(\gamma d) \quad (EQ5)$$

Zo and γ are known for each distributed frequency and AWG, Zin is measured for each distributed frequency, and d remains constant. Solving EQ5 for the loop length or distance d of LUT 8 at each distributed frequency yields the following equation EQ6:

$$d = \frac{\log 10(abs(2/(1 - Zo/Zin) - 1))}{\log 10(e) * real(\gamma) * 2} \quad (EQ6)$$

Figure 10:
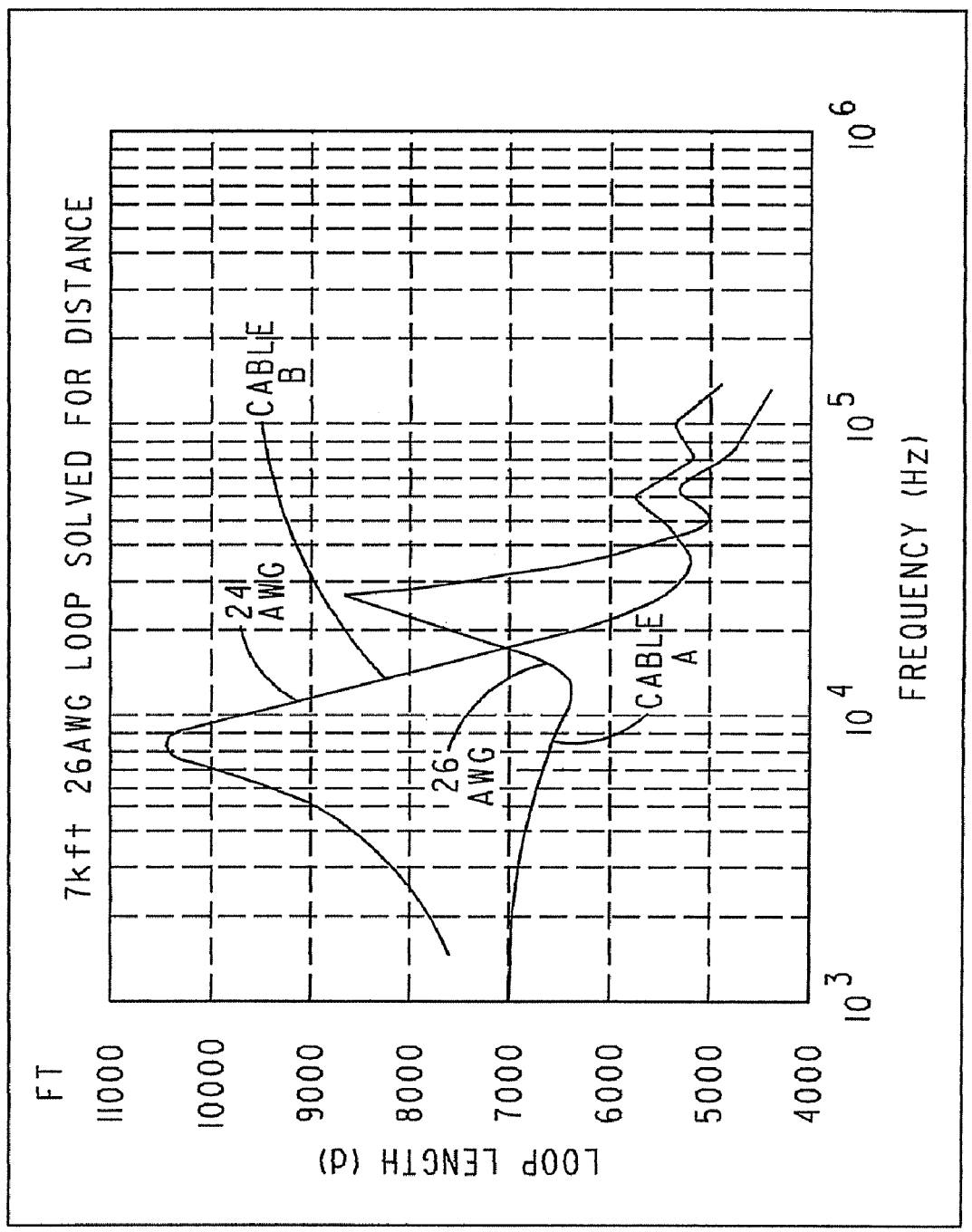
FIG. 10 shows plots of loop length (D) versus frequency for a pair of telephone lines made from data acquired by the high frequency test hardware of FIG. 2.

With Zin measured, the loop length or distance d at each distributed frequency can be plotted for cable type North American 26 AWG and 24 AWG as shown in the exemplary plots of FIG. 10.

Figure 11:
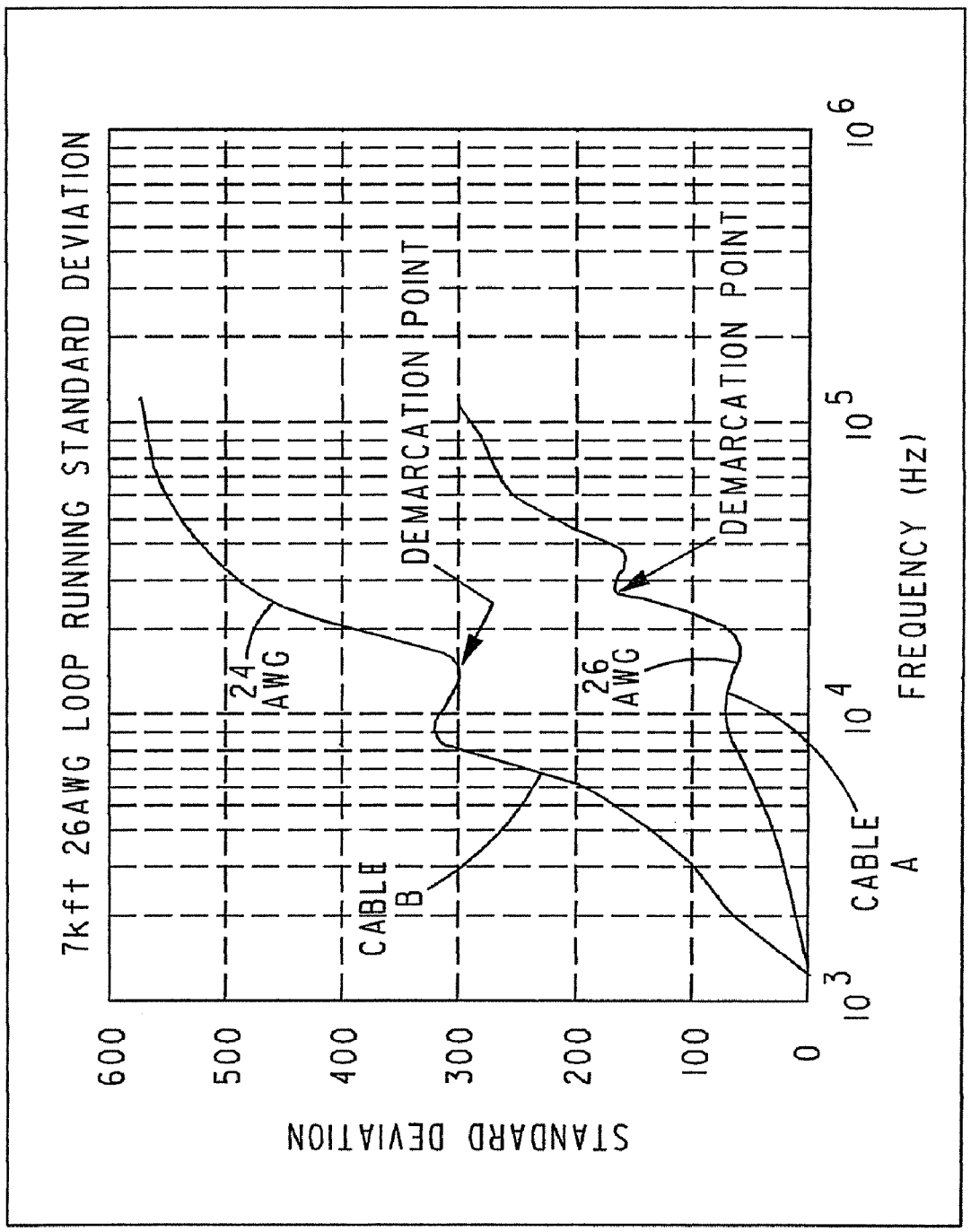
FIG. 11 shows plots of standard deviation versus frequency determined from the plots shown in FIG. 10.

Ideally, if LUT 8 were all one AWG, a plot of distance vs. frequency would, ideally, be flat and the mean value would be the distance of the cable. Rarely, this is the case in real applications. To determine the amount of variation from the flat line (mean), a plot of a running standard deviation of the points comprising the plot of distance d versus frequency is determined and evaluated for a first significant variation. For example, for each point comprising a plot of distance versus frequency, a standard deviation is determined for said point from the distance data for said point and all points prior to said point. The plot of standard deviations versus frequency is also known as a running standard deviation plot. FIG. 11 shows two examples of running standard deviation plots obtained from the distance versus frequency plots of FIG. 10.

Next, each running standard deviation plot is evaluated to determine where there exists the greatest difference between adjacent values of standard deviations between adjacent points or frequencies of the plot. Where this greatest difference occurs is denoted as the "demarcation point" on the plot.

If the running standard deviation for a first cable (of type A, e.g., a first AWG) is less than the running standard deviation of a second cable (of type B, e.g., a second AWG) and less than a predetermined standard deviation threshold, e.g., 100, up to the demarcation point, then the first cable is designated as being of type A with a length dm which is the mean of the distance (d) up to the demarcation point. Conversely, if running standard deviation of a first cable of type B is less than running standard deviation of second cable of type A and less than the predetermined standard deviation threshold up to the demarcation point, then the first cable is designated as being of type B with a length dm which is the mean of the distance (d) up to the demarcation point.

If, however, if the running standard deviation of a cable of unknown type is not below the predetermined standard deviation threshold, a small length 1 of the cable, e.g., 500 feet, is mathematically extracted from the overall length d of the cable to obtain a new (shorter) length dN of the cable for use in EQ4-EQ6.

The original length d of the unknown cable can be estimated by noting the frequency where the demarcation point of the standard deviation occurs in, for example, FIG. 11, and then by determining from the plot of length versus frequency as shown, for example, in FIG. 10, for the cable, the loop length corresponding to the frequency where the demarcation point occurs can be determined. In other words, the frequency where the demarcation point occurs in each plot shown in FIG. 11 can be utilized with the corresponding plot of loop length versus frequency in FIG. 10 to determine the loop length d of the corresponding cable.

The AWG of the small length extracted from the cable can be determined either empirically or by comparison of the original plot of standard deviation versus frequency for the cable to reference curves of running standard deviation versus frequency for various AWG values.

The small length 1 of cable is utilized in place of distance d along with the measured value of Zin in EQ4 to determine a new value of Zload for the new length dN of the cable. This new value of Zload, corresponding to the input impedance of the new length dN of the cable, is then substituted for the value of Zin in EQ6 to obtain a new value for distance d of the cable. This process of determining a new value of Zload in EQ4 and a new value for d in EQ6 is repeated for each distributed frequency, where the values for Zo, γ and Zin for each distributed frequency are utilized at said frequency to obtain a new plot of loop length d versus frequency of the type shown in FIG. 10. Once this new plot of loop length d versus frequency has been determined, new values of running standard deviation are calculated from the plot and these new values of running standard deviation are plotted versus frequency to derive another plot like those shown in FIG. 11.

If the AWG of the new value for distance d of the cable can be determined from the thus determined plot of the new values of running standard deviation versus frequency, the insertion loss for the new cable can be determined with reference to standard tables of insertion loss for cables of like AWG. The insertion loss for the new value of distance d of the cable can then be added to the insertion loss for the small length 1 of the cable mathematically extracted from the original length cable, where the insertion loss for this small length 1 of the cable is also determined from the standard tables of the insertion loss as well, to determine a second value insertion loss of the original length of the cable.

If high frequency test hardware 14 tests LUT 8 via an intervening test path, e.g., switch fabric 24, the effect of the test path on the test can be corrected for by determining for the LUT the value of $Z_{2TR}(f)$ in the manner discussed above in connection with equation EQ3 for Calibration stage 40 and Compensation stage 44 for low frequency test hardware 12 utilizing the open-circuit, short-circuit and nominal 160 ohm terminations. The thus determined value of $Z_{2TR}(f)$ can be substituted for the value of Zin for the corresponding distributed frequency in equations EQ4-EQ6.

Voting Algorithm:

In the foregoing description, DMU 2 included low frequency test hardware 12 and high frequency test hardware 14. By way of low frequency test hardware 12 and high frequency test hardware 14, first and second values of insertion loss can be determined for the loop length by using each of low frequency test hardware 12 and high frequency test hardware 14, respectively. Based on empirical data, DSP 18 calculates an "expected value" for the insertion loss. This will be the mean insertion loss value seen over all of a plurality of real world gauge configurations having the same loop length as the LUT 8.

The first value insertion loss determined utilizing low frequency test hardware 12 and the second value insertion loss determined utilizing high frequency test hardware 14 are averaged. If the average value insertion loss is sufficiently close to the expected insertion loss value, this average is deemed reasonable and DSP 18 returns the results to the OSS 16. Otherwise, the individual values are checked. An insertion loss value is deemed unreasonable if it is too far from the expected value or falls outside a predetermined acceptable range of insertion loss values. The predetermined acceptable range of insertion loss values and/or what constitutes too far from the expected insertion loss value can be selected by one of ordinary skill in the art to meet any suitable and/or desirable requirement(s). As discussed above, if the first and second insertion loss values determined by the low frequency and high frequency test hardware 12 and 14 are found to be reasonable, the average insertion loss is returned as the actual insertion loss of LUT 8. In the case of one unreasonable insertion loss value, the other is returned as the actual insertion loss of LUT 8. If both insertion loss values are unreasonable, the DSP 18 returns the expected value to the OSS 16 as the actual insertion loss of LUT 8.

Figure 9:
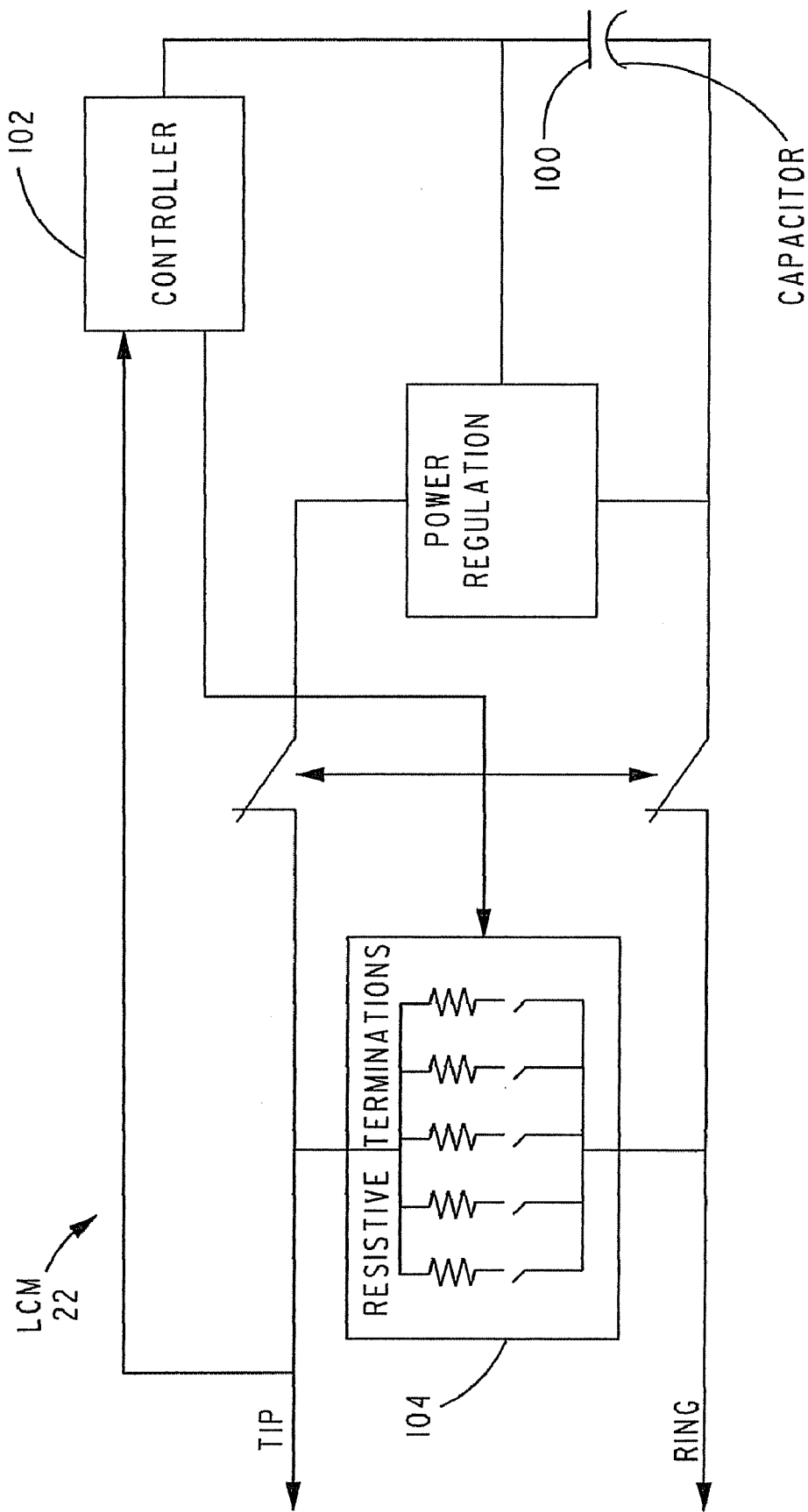
FIG. 9 is a diagrammatic view of the internal components of the line calibration module (LCM) shown in FIG. 1.

Loop Insertion Loss (LIL) Calibration Module (LCM):

LCM 22 shown in block diagram in FIG. 9 is utilized to provide calibration support for the high frequency and low frequency test hardware 12 and 14 discussed above. The main function of LCM 22 is to provide various resistive terminations on the Tip and Ring under the control of the corresponding test hardware. LCM 22 obtains its power from the corresponding test hardware via the Tip and Ring connection.

In general, a voltage level applied between the Tip and Ring is interpreted by LCM 22 as a request for a specific resistive termination, e.g., open circuit, short circuit, nominal 160 ohms, or nominal 900 ohms, and is also utilized to charge an internal capacitor 100 that powers an internal controller 102. Controller 102 includes an internal analog-to-digital-converter (not shown) for converting the voltage applied to the Tip and the Ring into a digital value for processing by a processor (not shown) of the controller 102. In operation, once capacitor 100 is sufficiently charged, the controller 102 samples the voltage applied to the Tip and the Ring and applies an appropriate resistive termination thereto for a suitable duration. When the resistive termination is applied to the Tip and the Ring, the controller 102 is isolated from the Tip and the Ring. Desirably, the input voltage is always Ring positive with respect to the Tip. The input voltage desirably ranges between 0 and 75 volts DC while the normal operating voltage is in the range of 10 volts to 50 volts DC. LCM 22 has protection for voltages above 75 volts DC as well as for reversed polarity.

The following chart illustrates the states, the resistive terminations 104 and durations of each resistive termination that LCM 22 applies to the Tip and Ring in response to the application of a specific Tip-Ring voltage by corresponding test hardware:

| Tip-Ring Voltage: | State: | Resistance Termination: | Duration required to Charge Capacitor 100 |
|---|---|---|---|
| 0-10 V | Idle | ~13k ohms | 8 sec |
| 20 V | Short | ~3 ohms | 8 sec |
| 30 V | 160Ω | ~164 ohms | 8 sec |
| 40 V | 909Ω | ~912 ohms | 8 sec |
| 50 V | Open | >10 Meg ohms | 8 sec |

In operation, LCM 22 will stay in the Idle State while recharging capacitor 100 when the input is less than or equal to 10 volts. LCM 22 always reenters the Idle State after applying a termination to recharge capacitor 100. This takes a few seconds. The initial charge takes the longest time, with the quickest charge time occurring with 50 volts input on the Tip and Ring.

In the above chart, it should be noted that the Short state is implemented by a resistive termination of approximately 3 ohms while an Open state is implemented by applying a resistive termination of greater than 10 mega-ohms.

Whenever LCM 22 is about to apply a termination, it enters the Open state thereby signaling the corresponding test hardware that a resistive termination is about to be applied. If no resistive termination is desired, the test hardware desirably applies 10 volts to the Tip and Ring, whereupon LCM 22 enters the Idle state. The corresponding test hardware can change its voltage at any time to request the new resistive termination. LCM 22 can be removed from frame 10 at any time.

The present invention has been described with reference to the preferred embodiment. Obvious modifications and alterations will occur to others upon reading and understanding the preceding detailed description. For example, while described in connection with various AWG, the present invention can also be utilized in connection with other wire gauges. Accordingly, the description of the present invention in connection with AWG is not to be construed as limiting the invention. Moreover, while use of the running standard deviation was described above in connection with the Analysis stage implemented by the high frequency test hardware, it is envisioned that other methods could be employed to find the demarcation point. Examples of such methods include, without limitation, evaluation of the variance (the square of the standard deviation) of each distance vs. frequency curve in FIG. 10; and vector analysis of each distance vs. frequency curve in FIG. 10 which is accomplished by fitting a vector to the curve up to the demarcation point which is determined by evaluating where the deviation from the vector surpasses a threshold value and then evaluating the angle of at least one vector to determine the cable makeup. Also or alternatively, each distance vs. frequency curve in FIG. 10 can be compared to one or more predetermined distance vs. frequency curves derived from cables having known lengths and AWG and designating and returning the insertion loss of the cable associated with the predetermined distance curve that best matches the distance curve in FIG. 10. An example of a matching technique that can be utilized to find the best match between a distance versus frequency curve of an unknown LUT and a distance versus frequency curve of a known LUT is the least squares technique. Also or alternatively, while use of equivalent values Rs, Cs, Rp and/or Cp of $Z_{2TR}$ was described above in connection with the Analysis stage implemented by the low frequency test hardware, it is envisioned that other equivalent values of $Z_{2TR}$, such as equivalent series and/or parallel inductance values Ls and Lp, respectively, and/or series and/or parallel conductance values Gs and Gp, respectively, or any combination of Rs, Cs, Ls, Gs, Rp Cp, Lp and Gp can also be utilized for determining the values of the predictors x in equation EQ2 in a manner like the manner describe above for determining the predictors x in equation EQ2 from the equivalent values Rs, Cs, Rp and/or Cp of $Z_{2TR}$. It is intended that the invention be construed as including all such modifications and alterations insofar as they come within the scope of the appended claims or the equivalents thereof.

The invention claimed is:

1. A system for determining insertion loss of a telephone line under test (LUT) comprising:
   means responsive to electrical stimulation of an input of the LUT at each frequency of a plurality of discrete frequencies for predicting a length d of the LUT at said frequency;
   means for determining a running standard deviation of the length d of the LUT at each frequency of the plurality of discrete frequencies, wherein the running standard deviation at each frequency is determined as a function of the predicted lengths d determined for the LUT at and below said frequency;

means for determining a mean length (dm) of the LUT as a function of the lengths d of the LUT determined for each frequency at and below the pair of adjacent frequencies where the largest difference between running standard deviations occurs;

means for determining a gauge of the LUT as a function of the running standard deviation of the one of said pair of adjacent frequencies; and means for determining an insertion loss value of the LUT as a function of the gauge and the mean length dm.

2. A method of determining insertion loss of a telephone line under test (LUT) comprising:
   (a) predicting a length d of the LUT from at least one measurement of the LUT at each frequency of a plurality of discrete frequencies;
   (b) determining a running standard deviation of the length d of the LUT at each frequency of the plurality of discrete frequencies, wherein the running standard deviation at each frequency is determined as a function of the predicted lengths d determined for the LUT at and below said frequency;
   (c) determining a mean length (dm) of the LUT as a function of the lengths d of the LUT determined for each frequency at and below one frequency of a pair of adjacent discrete frequencies where the largest difference between running standard deviations occurs;
   (d) determining a gauge of the LUT as a function of the running standard deviation of the one of said pair of adjacent frequencies; and
   (e) determining an insertion loss value of the LUT as a function of the gauge and the mean length dm.

3. A system for determining insertion loss of a telephone line under test (LUT) comprising:
   means responsive to single-ended electrical stimulation of an input of the LUT at each frequency of a plurality of discrete frequencies for predicting a length d of the LUT at said frequency;
   means for determining a mean length (dm) and wire gauge of the LUT as a function of the length d of the LUT at each frequency of the plurality of discrete frequencies; and
   means for determining an insertion loss value of the LUT as a function of the gauge and the mean length dm.

4. A system for determining insertion loss of a telephone line under test (LUT) comprising:
   means responsive to electrical stimulation of an input of the LUT at each frequency of a plurality of discrete frequencies for predicting a length d of the LUT at said frequency;
   means for determining a mean length (dm) and wire gauge of the LUT as a function of the length d of the LUT at each frequency of the plurality of discrete frequencies; and
   means for determining an insertion loss value of the LUT as a function of the gauge and the mean length dm, wherein the mean length (dm) and wire gauge of the LUT are determined as a function of one of:
   a running standard deviation of the length d of the LUT vs. frequency at each of the plurality of discrete frequencies;
   a variance of the length d of the LUT vs. frequency at each of the plurality of discrete frequencies; and
   a comparison of the length d of the LUT vs. frequency at each of the plurality of discrete frequencies to a length of a known cable vs. frequency.

5. A method of determining insertion loss of a telephone line under test (LUT) comprising:
   single-endedly predicting a length d of the LUT at each frequency of a plurality of discrete frequencies as a function of an electrical stimulation of the LUT at said frequency;
   determining a mean length (dm) and wire gauge of the LUT as a function of the length d of the LUT at each frequency of the plurality of discrete frequencies; and
   determining an insertion loss value of the LUT as a function of the gauge and the mean length dm.

6. A method of determining insertion loss of a telephone line under test (LUT) comprising:
   predicting a length d of the LUT at each frequency of a plurality of discrete frequencies as a function of an electrical stimulation of the LUT at said frequency;
   determining a mean length (dm) and wire gauge of the LUT as a function of the length d of the LUT at each frequency of the plurality of discrete frequencies; and
   determining an insertion loss value of the LUT as a function of the gauge and the mean length dm, wherein the mean length dm and wire gauge of the LUT are determined as a function of one of:
   a running standard deviation of the length d of the LUT vs. frequency at each of the plurality of discrete frequencies;
   a variance of the length d of the LUT vs. frequency at each of the plurality of discrete frequencies; and
   a comparison of the length d of the LUT vs. frequency at each of the plurality of discrete frequencies to a length of a known cable vs. frequency.

* * * * *